United States Patent [19]

Hoffmann et al.

[11] 3,831,043

[45] Aug. 20, 1974

[54] PIEZOELECTRIC OSCILLATOR ARRANGEMENTS

[75] Inventors: Rudolf Hoffmann, Germering; Manfred Mackuth; Werner Mattuschka, both of Munich; Franz Schoefer, Fichenau, all of Germany

[73] Assignee: Siemens Aktiengesellschaft, Berlin & Munich, Germany

[22] Filed: Dec. 13, 1972

[21] Appl. No.: 314,862

[30] Foreign Application Priority Data

Dec. 28, 1971 Germany ............................ 2165143

[52] U.S. Cl. ...................... 310/9.7, 310/9.6, 310/9.8

[51] Int. Cl. ............................................ H04r 17/00

[58] Field of Search ............... 310/8.2, 9.5, 9.6, 9.7, 310/9.8; 331/158

[56] References Cited

UNITED STATES PATENTS

| | | | |
|---|---|---|---|
| 2,095,376 | 10/1937 | Bechmann | 310/9.7 |
| 3,059,130 | 10/1962 | Robins | 310/9.7 X |
| 3,521,090 | 7/1970 | Angeloff | 310/9.8 X |
| 3,721,841 | 3/1973 | Wilson | 310/9.8 X |

FOREIGN PATENTS OR APPLICATIONS

| | | | |
|---|---|---|---|
| 862,778 | 11/1952 | Germany | 310/9.7 |
| 1,113,477 | 9/1961 | Germany | 310/9.6 |

OTHER PUBLICATIONS

Flexure Mode Quartz Oscillators, by Bean & Richards, The Marconi Review, No. 111, Vol. XVI, 4th Quarter, 1953.

*Primary Examiner*—Mark O. Budd

*Attorney, Agent, or Firm*—Hill, Gross, Simpson, Van Santen, Steadman, Chiara & Simpson

[57] ABSTRACT

A piezoelectric oscillator includes a bar of piezoelectric material having four longitudinal surfaces carrying respective electrodes or electrode areas thereon. The longitudinal edges are chamfered to separate the electrodes or electrode areas and selected electrodes and electrode areas are connected via transverse grooves through the chamfers which carry the electrode material. The grooves are first cut in the piezoelectric bar to a depth greater than that of the chamfer. Then a cohesive conductive coating is applied over the surfaces of the bar and the grooves. Next, the edges are ground to separate the electrodes, except for the connections through the grooves. Two pair of electrodes are connected to respective mutually opposed electrodes at nodal points of the oscillator in the same plane for mechanically mounting and electrically energizing the oscillator.

4 Claims, 2 Drawing Figures

PIEZOELECTRIC OSCILLATOR ARRANGEMENTS

DESCRIPTION

Figure 1:
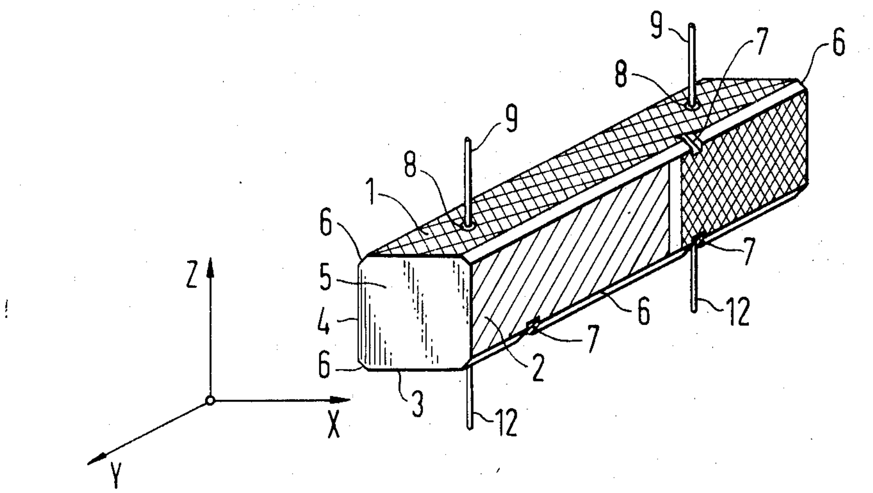

The present invention relates to piezoelectric oscillator arrangements, and more particularly it concerns an electrode arrangement for a rectangular bar-type piezoelectric oscillator operating in the bending mode, which is provided on its four longitudinal faces with electrodes and in which, at each of two mutually-opposite faces, are arranged two wires, serving for mechanical fixing purposes and as electrical connections, at points corresponding to oscillation nodes.

An object of the invention is to provide an electrode arrangement of this kind, which suitably fulfills the requirements imposed upon bending mode oscillators, in terms of their attachment to a fixing frame and at the same time is simple to manufacture.

The invention comprises an electrode arrangement for a rectangular bar-type piezoelectric oscillator adapted to operate in the bending mode, and having electrodes on its four longitudinal faces. Two connecting wires which serve for mechanical fixing purposes and also for electrical contacting are arranged on each of two mutually-opposite faces at points corresponding to nodes of oscillation. The electrodes on the neighboring first and fourth of said four faces completely cover these faces, and the electrodes on the neighboring second and third of said four faces each comprise areas separated from one another by at least one transverse discontinuity. The two pairs of connecting wires are attached to the first and third faces. The electrode area on the second face comprises two sections divided by a discontinuity located between the connecting wires. The electrode area on the third face comprises three sections divided by two discontinuities located between the respective two connecting wires.

The electrode on the first face is connected to one of the electrode sections on the second face which is connected to the center electrode section on the third face. The other electrode section on the second face is connected to the neighboring outer electrode section on the third face which is connected to the electrode area on the fourth face.

A bending mode oscillator is thus obtained which, at each of two opposite side surfaces, has two points of contact for the connecting wires so that the latter can be attached directly to the same mounting element of a mounting frame. Because all four connecting wires, which are arranged in pairs at opposite side surfaces of the bending mode oscillator, are located in the same plane, the advantage is obtained that a particular simple and compact mounting frame can be used for the oscillator. The mounting frame may for example consist simply of two metal mounting elements which are insulated from one another, and each of which is soldered to a pair of connecting wires at respective sides of the bending oscillator. The mounting elements thus serve both as a mechanical attachment and also as electrical leads for the oscillator and are arranged at a short distance from the oscillator and parallel to the sides at which the connecting wires are attached thereto.

In order to separate electrodes arranged upon neighboring side surfaces of the oscillator, according to a preferred embodiment of the invention, the longitudinal edges of the oscillator, having surfaces which are initially provided with a cohesive conductive layer, are ground off. In order to connect electrodes or electrode sections arranged upon neighboring side surfaces, groove-like recesses extending transversely of the edge direction, are machined in the edges of the bending oscillator prior to the grinding off of the longitudinal edges and prior to the application of the conductive layer, and the groove depth is made greater than the maximum depth of the edge grinding.

A quartz bar operating as an XY bending-mode oscillator can be used, the electrodes being in the form of metallized layers on the quartz bar. The electrodes are preferably manufactured by vacuumcoating the surface of the bending-mode oscillator, with a chrome-platinum-gold layer. The individual electrodes arranged on the various side surfaces of the oscillator, are separated from one another by simply grinding small facets or chamfers on the longitudinal edges of the bar, and this does not electrically separate those layers which remain connected with one another through the metal deposits located in the previously ground groove-like recesses.

Figure 2:
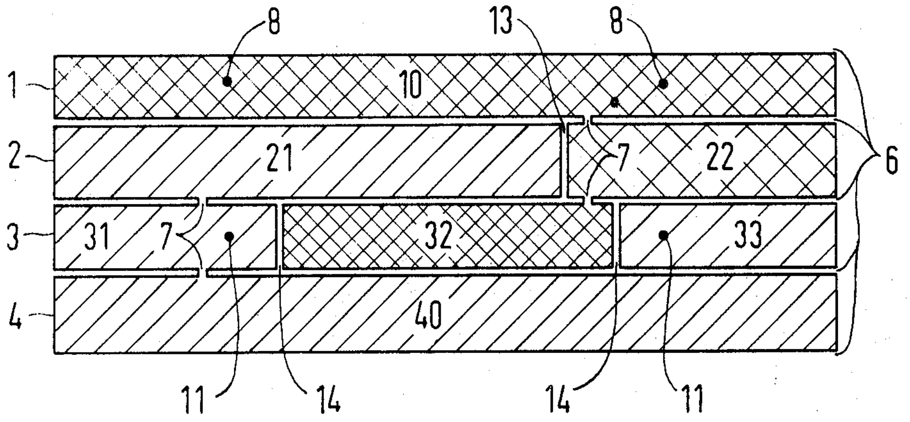

Other objects, features and advantages of the invention, its organization, construction and operation will be best understood by reference to the following detailed description of an embodiment thereof taken in conjunction with the accompanying drawing, on which:

FIG. 1 is a perspective view of a piezoelectric bar with an electrode arrangement in accordance with the invention; and FIG. 2 shows the electrode arrangement of FIG. 1 in developed form.

A piezoelectric bar 5 is illustrated in FIG. 1 and is a YX bending-mode quartz oscillator. On each of the two YX surfaces 1, 3 of the quartz bar, pairs of connecting wires 9 and 12 respectively are arranged at pairs of nodal points 8, 11 respectively. The nodes 11 of oscillation, at which the connecting wires 12 are attached, can be seen in FIG. 2 only. The bar 5 also carries a pair of electrodes on its YZ surfaces 2, 4, these being separated from those on the YX surfaces 1, 3 by facets 6, which facets are ground on the longitudinal edges of the bar 5. Those electrodes which are connected with one another by metal deposits located in previously-ground, groove-like recesses 7 remain connected with one another after the grinding down of the longitudinal edges of the bar 5. The electrode arrangement which results, will be explained in more detail with reference to FIG. 2.

The YX surface 1 and the YZ surface 4 of the quartz bar 5 (see also FIG. 1), are adjacent one another and have electrodes 10, 40 which completely cover them. The YZ surface marked 2 and the YX surface marked 3, of the bar 5 (FIG. 1) are likewise adjacent one another and carry electrode sections 21, 22 and 31, 32, 33, respectively, which are separated from one another by discontinuities 13, 14 respectively. More specifically the YZ surface 2 is divided into two electrode sections 21, 22 by a discontinuity 13 located in the region between the connecting wires 9, 12 or, in other words, between the nodal points 8, 11. The YX surface 3 is divided into three electrode sections 31, 32, 33 by two discontinuities 14 located between the connecting wires 12 or, in other words, between the nodal points 11. The electrode 10 on the YX surface 1 is connected to the smaller electrode section 22 of the YZ surface 2. This electrode section 22 is furthermore connected to the center electrode section 32 on the YX surface 3. The other, larger electrode section 21 on the YZ surface 2, is connected to the neighboring outer electrode section 31 of the YX surface 3, and this latter electrode in turn to the electrode 40 covering the YZ surface 4.

To separate the individual electrodes from one another, the longitudinal edges of the quartz bar 5, which is initially covered by a cohesive conductive layer, are ground down so that facets 6 are produced. To interconnect electrodes thus formed upon neighboring side surfaces, prior to the grinding down of the longitudinal edges and prior to the application of the conductive layer, which may for example consist of chromium-platinum-gold, groove-like recesses 7 (see FIG. 1) are machined in the edges of the quartz bar. The groove depth is made greater than the maximum depth to which the edges are to be ground off, thereby ensuring that the metal deposits in the recesses remain after the grinding of the edges and thus establish electrical connections between the electrodes or electrode sections 10, 22 and 32 and also between the electrode or electrode sections 21, 31, and 40.

This electrode arrangement can be manufactured without difficulty and has the essential advantage that the bending mode oscillator can be mounted in a mounting frame of simple design to provide a compact installation. By the use of an electrode arrangement in accordance with the invention, the result is achieved that at each of the two YX surfaces 1, 3 of the quartz rod 5, contacting or fixing points are available at the two nodes 8, 11 of oscillation, so that all the connecting wires 9 and 12 can be attached to one and the same mounting element of a mounting frame (not shown). For this reason, the mounting frame can be simply constructed to include two metal mounting elements which are electrically insulated from one another, which are soldered to the respective connecting wires 9 and 12 and which run close to the quartz rod 5, parallel to the YX surfaces 1, 3. Because all the connecting wires 9, 12 are located in one plane and are soldered to the mounting element of the frame in this same plane, the advantage is obtained that the resultant quartz rod oscillator can be installed in a very flat casing.

Although we have described our invention by reference to a specific illustrative embodiment thereof, many changes and modifications may become apparent to those skilled in the art without departing from the spirit and scope of the invention. We therefore intend to include within the patent warranted hereon all such changes and modifications as may reasonably and properly be included within the scope of our contribution to the art.

What we claim is:

1. An electrode arrangement for a rectangular bar-type piezoelectric oscillator having having first, second, third and fourth longitudinal faces and adapted to operate in the bending mode, comprising electrodes on said four longitudinal faces, two connecting wires serving for mechanical fixing purposes and for electrical contacting being arranged on each of two mutually-opposite ones of said faces at points corresponding to nodes of oscillation, the electrodes on the adjacent first and fourth of said four faces completely covering such faces, the electrodes on the adjacent second and third of said four faces each comprising areas separated from one another by at least one transverse discontinuity, said connecting wires attached to said first and third faces, the electrode on the second face comprising two areas divided by a discontinuity located between the connecting wires, the electrode on the third face comprising three areas divided by two discontinuities located between the two respective connecting wires, the electrode on said first face connected to one of the electrode areas on said second face which is connected to the center electrode area on the third face, the other electrode area on said second face connected to the adjacent outer electrode area on said third face which is connected to the electrode on said fourth face.

2. An electrode arrangement as claimed in claim 1 wherein said electrodes consist of layers of chromium-platinum-gold.

3. An electrode arrangement as claimed in claim 1, comprising chamfer areas at the edge of the oscillator between adjacent electrodes on adjacent faces of the oscillator separating such electrodes, and wherein each connection between electrodes on adjacent faces of the oscillator includes a transverse groove in one of said chamfer areas and a conductive coating in said groove.

4. An electrode arrangement as claimed in claim 3 wherein said electrodes consist of layers of chromium-platinum-gold.

* * * * *